Jan. 11, 1944.  A. E. USHAKOFF  2,338,787
METHOD OF MAKING ARTICLES
Filed Jan. 10, 1939  2 Sheets-Sheet 1

Jan. 11, 1944.   A. E. USHAKOFF   2,338,787
METHOD OF MAKING ARTICLES
Filed Jan. 10, 1939   2 Sheets-Sheet 2

INVENTOR
Alexis E. Ushakoff
By his attorney
Victor Cobb

Patented Jan. 11, 1944

2,338,787

UNITED STATES PATENT OFFICE 2,338,787

METHOD OF MAKING ARTICLES

Alexis E. Ushakoff, Beverly, Mass., assignor to United Shoe Machinery Corporation, Borough of Flemington, N. J., a corporation of New Jersey Application January 10, 1939, Serial No. 250,188

8 Claims. (Cl. 18—55)

This invention relates to a method of making articles and is herein set forth with particular reference to injection molding.

Heretofore, injection molding compounds have consisted of thermoplastic substances, such as, for example, cellulose acetate, which in granular form are heated to a temperature at which they will be converted into a very viscous liquid which will flow under pressure, and are then forced into the cavities of a cold mold to cause them to solidify and take on the exact shape of these cavities. Such plastics do not change instantly from a state in which they will flow to a solid upon cooling and must therefore remain for a considerable interval in the mold before they can safely be removed. Furthermore, it is difficult, if not impossible, to manufacture by this method thin-walled articles—articles having walls of a thickness of less than about .04 of an inch—because the adhesion of such thin-walled articles to the mold is so strong that they are liable to be broken when being removed.

In accordance with one feature of the invention, there is provided a method, which may be used for injection molding, said method including the use of a sol of an organic plastic material, such, for example, as a linear macromolecular complex polymer, which sol has a low viscosity at elevated temperatures and upon being cooled sets substantially instantly to a lyogel. This sol can be introduced into the machine as such, or if a preformed lyogel is introduced, this lyogel can be converted into the sol by heat, or a suspension of the complex polymer in an appropriate solvent can be introduced and heated. In any case the easy flowing sol is injected in a stream into the cavities of a cool mold where it will at a predetermined temperature be converted or reconverted into a lyogel. The composition of the sol is such that the transformation from sol to lyogel is accompanied by a desired syneresis, just sufficient so that the surfaces of the formed coherent lyogel become instantly coated with a thin film of liquid, thus preventing the formed lyogel from adhering to the walls of the cool mold. This permits immediate opening of the mold after gelation has taken place, thereby at least doubling the speed of operation in comparison to previous methods. The lyogel shrinks upon evaporation of its liquid content. Since the amount of shrinkage depends upon the substances forming the gel and the proportion of liquid to solid originally used when making the compound, the amount of shrinkage can be carefully controlled. This fact and the above-mentioned syneresis permit the use of molds with enlarged dimensions of the final article to be produced, and in addition the shrinkage permits easy production of extremely thin-walled articles which so far has been impossible in regular injection molding processes. It is thus possible to produce, for example, a thin-walled gelled article having a wall thickness of say .02 of an inch which will shrink to a hard tough homogeneous film or pellicle of a thickness of .005 of an inch or less. Such articles may be used, for example, as covers for wood heels, bottle caps, membranes suitable for ultrafiltration, seamless packages, etc.

In other words it may be stated that the invention provides a method of making gelled articles which utilizes the liquid produced by syneresis to provide lubrication between the gelled article and the cool member with which the hot sol is caused to contact. Although the advantages of my invention may be realized with any suitable sol, I have illustrated the invention in connection with injection molding and certain specific sols which I have found to be of special interest in connection with the production of thin-walled, hollow articles suitable, for example, to be used in covering heels.

A suitable molding compound in the form of an easy-flowing sol ready to be forced into the cavities of a cold mold may be prepared by dissolving at an elevated temperature a complex polymer of certain colloidal substances in a liquid which at room temperature is not a solvent for the complex polymer and exerts a greater solvent action upon at least one of the components of the complex polymer than upon another, but at elevated temperatures is a solvent for the complex polymer. In order to insure the production of a gelled article which is strong enough to be readily handled and will shrink to form a hard tough homogeneous film, the complex polymer should preferably be formed from linear macromolecules; and it is further desirable, but not essential that the liquid should be one which has a comparatively low boiling point, so that it will evaporate from the produced gel in a short time and at low temperature. To the liquid and the complex polymer may be added, if desired, varying amounts of plasticizers and/or fillers to impart the desired degree of flexibility and toughness to the finished film. The term "linear macromolecule," as used herein, denotes a linear polymer, that is, a macromolecule of anisometric shape and of such molecular size that it exhibits colloidal properties. The term complex polymer as used herein denotes a compound obtained when a substance capable of polymerization, or a linear macromolecular substance capable of condensation or substitution yields with another substance or substances a product which has a type of molecular structure similar to or identical in its properties with that of interpolymers produced by interpolymerization in that it is not a simple mixture of polymers, but a complex having solubility characteristics which differ depending upon the proportions of the substances of which it is made. The term complex polymer, as used herein, therefore includes not only interpolymers but also compounds such for example as (1) mixed esters of cellulose which may be made by esterifying cellulose with one acid radical and then with another or others, and (2) a polymer which may be made by polymerizing vinyl acetate and removing some of the acetyl groups by hydrolysis. The methods by which these products are made are immaterial, the present invention being concerned entirely with the products. The term "lyogel" denotes a gel obtained from a solvatized sol, for example by cooling, the lyogel retaining practically all the solvent of the original sol.

Referring to the accompanying drawings.

A sol, according to the present invention, may be made by treating at an elevated temperature a complex polymer consisting of a linear macromolecular mixed ester of cellulose with a liquid which at room temperature exerts a greater solvent action upon one of the esters than upon another and at elevated temperatures is a solvent for the mixed ester. A liquid, preferably a mixture, is first found which is a solvent for the complex polymer at elevated temperatures but not at room temperature. As an aid in selecting a complex polymer of the proper composition to be used with such liquid, it is convenient to prepare a triangular graph such as that shown in Fig. 1, which is a graph of the same kind as is shown in Letters Patent of the United States, No. 2,078,261, granted April 27, 1937, upon an application filed in the name of Carl J. Malm, and shows the soluble regions of mixed esters of cellulose which are made up of three variables, such graphs being based upon the property of equilateral triangles that the sum of the perpendiculars drawn from any point to the three sides is equal to the altitude of the triangle.

Figure 1:
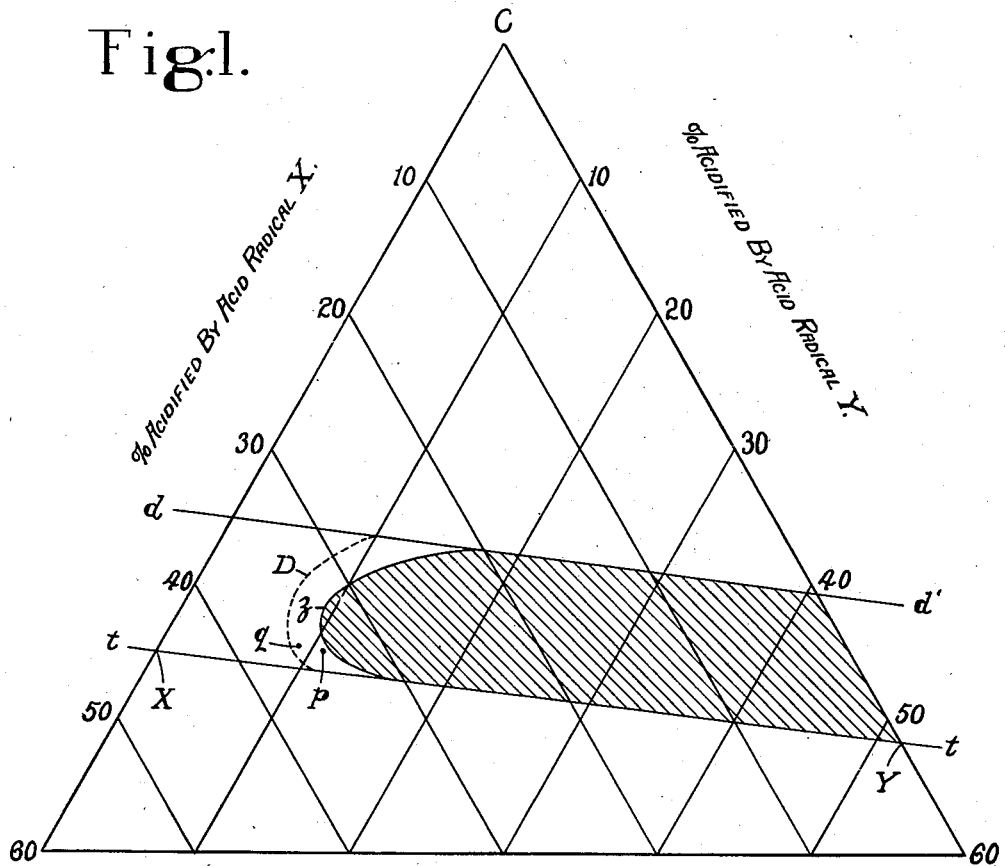
Fig. 1 is a triangular graph showing the soluble regions of mixed esters of cellulose.

In the graph of Fig. 1, the point at the apex C represents unesterified cellulose, the line $t$, $t'$, the fully esterified triesters of cellulose and the line $d$, $d'$, the diesters of cellulose. The point X at the intersection of the line $t$, $t'$, with the left-hand side of the triangle represents cellulose fully esterified by the acid radical X. The point Y at the junction of the line $t$, $t'$ with the right-hand side of the triangle represents cellulose fully esterified by the acid radical Y. The curved line $z$, extending from the line $d$, $d'$ to the line $t$, $t'$ indicates that the various mixed esters represented by points in the shaded area bounded by this line, portions of the lines $t$, $t'$ and $d$, $d'$ and by the right-hand side of the triangle are soluble at room temperature in a liquid Z which at room temperature is a solvent for one of the esters but not for the other, and at an elevated temperature is also a solvent for certain mixed esters outside the shaded area. In the graph, only those mixed esters, which are included between the lines $t$, $t'$ and $d$, $d'$ are considered, since it is preferable to use one of these mixed esters for the purposes of the present invention. The lower portion of the triangle, on the sides of which the numbers would run from 70 to 100, is omitted since it is impossible to esterify cellulose farther than to replace the three replaceable hydroxyl groups.

Since the mixed esters represented by the points in the shaded area are soluble at room temperature in the liquid Z, they are not suited to the formation of a lyogel at this temperature. In order to produce a lyogel at room temperature a mixed ester is chosen, the composition of which is indicated by a point such as $p$, which lies outside the shaded area but within an area, such as that between the dotted line D and the line $z$, in which the mixed esters indicated by the points in that area are soluble in the liquid Z at a selected elevated temperature. It should be understood that the boundaries represented for convenience by the lines on the graph are not definite and should really be shown as bands, since with colloids of varying degree of polymerization (particle size) the change from complete solubility to complete insolubility is gradual, and observers would probably differ as to the exact points at which complete solubility and complete insolubility occur. Such graphs, however, are sufficiently accurate to facilitate greatly the preparation of a compound according to the invention.

When this mixed ester is dissolved in the liquid Z at elevated temperature and allowed to cool to room temperature, a gel will result. The gel may or may not be a lyogel suitable for the particular use desired, which, for convenience, will be assumed to be for use as a heel cover. What is desired in such a case is a lyogel which is homogeneous, tough, and elastic, which exhibits a small amount of syneresis in its formation and will shrink to a hard, clear film. If the lyogel which results from the use of a mixed ester represented by the point $p$ is not such a gel but is, for example, on the point of becoming a sol, then a mixed ester of somewhat different composition may be chosen; for instance, one the composition of which is represented by the point $q$ which lies nearer the line D.

In general, to increase the syneresis as well as to obtain a tough elastic lyogel, the complex polymer should be so chosen that gelling takes place just below the elevated temperature, and the elevated temperature should be as far as practically possible above room temperature since the syneresis of the resulting lyogel is proportional to, or at least is a function of, the drop in temperature from the temperature at which the gelling takes place. The degree of syneresis, however, should not be carried too far since there is an optimum degree for any given substance beyond which the properties of the resulting lyogel begin to suffer. If the compositions of the liquid and the complex polymer are not carefully chosen, the cooling of the sol may result in excessive coagulation by too rapid desolvation or in a product which has either no syneresis or not the desired amount. The too rapid desolvation results in partial coagulation instead of the formation of a true lyogel. Syneresis in this case will be extremely violent, causing a rupture of the coherent gel structure, either resulting in a weak gel or in certain cases even in the formation of individual flocks or a powdery precipitate instead of a tough elastic lyogel.

Instead of changing the composition of the mixed ester, that is, instead of choosing a mixed ester, the composition of which is represented by the point $q$, the same result may often be secured by changing the liquid or the composition of the mixed liquid.

The use of complex polymers is an important feature of this invention. Depending upon the proportions of the basic substances used, compounds are obtained which differ in solubility, and this property, depending upon the proportions, can be varied over a considerable range. The use of complex polymers therefore permits a careful control of solubilities and the adjustment of the compound to temperatures found most suitable in the molding operation. The use of mixed solvents, although not absolutely essential, is nevertheless highly beneficial, because it permits careful adjustment of the influence which the solvent exercises on the compound at the different working temperatures, thus increasing the control of the different steps in the process, as well as the properties of the final product.

A thermally reversible injection molding compound which at an elevated temperature is a sol and at room temperature is a tough, elastic, lyogel, which exhibits in its formation sufficient syneresis to prevent it from sticking to the walls of a cool mold and will shrink greatly but controllably to a hard, flexible, homogeneous film, may be made as follows:

Example I

The linear macromolecular complex polymer is cellulose acetate-propionate of a composition by weight of 30.8% acetyl and 12.9% propionyl. The liquid is a mixture of equal parts by volume of benzol (benzene) and methanol. At elevated temperature the entire complex polymer goes into solution. From 10 to 30 parts by weight of the cellulose acetate-propionate and from 90 to 70 parts by weight of the liquid are placed in a closed mixing apparatus and maintained for an interval at 93° C.

Example II

The complex polymer is cellulose acetate-propionate of the same composition as that given in Example I. The liquid is a mixture by volume of 35 parts chloroform and 65 parts methanol. From 10 to 30 parts by weight of the cellulose acetate-propionate and from 90 to 70 parts by weight of the liquid are treated at 93° C.

Example III

The complex polymer is cellulose acetate-butyrate of a composition by weight of 31.3 acetyl and 15.6 butyril. The liquid is a mixture by volume of 60 parts benzol and 40 parts methanol. From 10 to 30 parts by weight of the cellulose acetate-butyrate and from 90 to 70 parts by weight of the liquid are treated at 93° C.

Example IV

The complex polymer is cellulose acetate-butyrate of the same composition as in Example III. The liquid is a mixture by volume of 40 parts chloroform and 60 parts methanol. From 10 to 30 parts by weight of cellulose acetate-butyrate and from 90 to 70 parts by weight of the liquid are treated at 93° C.

An injection molding compound in the form of a thermally reversible sol may be prepared from a linear macromolecular mixed ester of vinyl alcohol, for example from conjointly polymerized vinyl chloride and vinyl acetate. In this case it will be assumed that no graph showing solubilities of various compositions of the complex polymers in given liquids is first prepared.

A proper beginning, as in the case of the mixed esters of cellulose, would be to find a liquid, preferably for reasons mentioned previously a mixture of liquids, which exerts a greater solvent action upon one of the components of the complex polymer than upon the other, and is a solvent for the complex polymer only at an elevated temperature. For example suppose, as has been found to be true, that a liquid consisting of certain proportions of chloroform and benzol meets the requirements as to solvent power of a complex polymer consisting of equal parts of vinyl chloride and vinyl acetate having a molecular chain of unknown length. The complex polymer is dissolved in the hot liquid and allowed to cool. If it is found that the sol is just at the point of gelling at room temperature, the compound is not entirely suitable, since its gelling, if at all possible, would require costly cooling equipment for the injection molding machine. The next step is to repeat the procedure with a complex polymer of a different composition, for example one which contains more of the vinyl chloride, which in general is less soluble than the vinyl acetate, or to repeat the procedure with a complex polymer of the same composition but having a longer molecular chain because the solubility decreases with increase in the length of such chain, or to change the liquid or the percentage of the ingredients of the liquid so as to produce a liquid which has not so great a solvent power. By using a complex polymer having a longer molecular chain, or one in which the percentage of the polymers has been changed, or by using a liquid, the percentage of the ingredients of which has been changed, it is possible to produce the desired sol provided that a solvent can be found which has the characteristics identified above.

Example V

The linear macromolecule is a complex polymer of 95 parts by weight of vinyl chloride and 5 parts by weight of vinyl acetate. The liquid is a mixture by volume of 63 parts of chloroform and 37 parts of benzol. 10 to 30 parts by weight of the complex polymer and 90 to 70 parts by weight of the liquid are treated at 93° C.

Example VI

The linear macromolecular complex polymer is the same as that of Example V. The liquid is chloroform. 10 to 30 parts by weight of the complex polymer and 90 to 70 parts by weight of chloroform are treated at 93° C.

If it is not possible to find a solvent having the desired characteristics and consequently is not possible to make use of a complex polymer of, say, two selected polymers, it may nevertheless be desired to make use of one of the polymers because this polymer has certain properties which are desired in the lyogel which is to be made; and this can often be done by preparing a complex polymer of the selected polymer and another polymer, the proportions of the polymers being so chosen that the selected polymer greatly predominates and will therefore transmit its properties with only slight modification to the resulting lyogel. By the above method of preparing the compound it is possible to select a suitable polymer of the type described (a linear macromolecular polymer) and modify its properties by producing with it and another polymer of the same type a complex polymer. In such case this other polymer will be chosen on the basis (1) of its capability of forming a complex polymer with the selected polymer and (2) of its capability of satisfactorily modifying the solubility characteristics of the selected polymer with respect to the liquid (preferably a mixture) which is to be employed. If several of these other polymers are available so far as concerns the formation of a sol which upon cooling will revert to a lyogel, the final choice of the other polymer to be used with the selected polymer will be that one of the other polymers which will impart the best physical properties to the desired final product. It is thus possible to use complex polymers which are substantially unsoftened by heat, since in the sol form the flow characteristics are principally determined by the proportion of the complex polymer to the liquid used. Consequently, substances which are not sufficiently thermoplastic to be used for example in standard molding, unless plasticized to an extent in which their desirable properties are impaired or destroyed, can be modified without regard to this lack of suitable thermoplasticity and formed into articles which may or may not be plasticized depending upon the requirements of the finished article.

Example VII

The selected polymer is polyvinyl alcohol, and the liquid to be used is a mixture of methanol and water. A complex polymer is formed having a composition by weight of 95 parts of polyvinyl alcohol and 5 parts of polymerized vinyl acetate, 300 grams of this solid being treated at 150° C. with a mixture of 850 c. c. methanol and 150 c. c. water.

In the examples given above, the molded, gelled compound suitable for use when shrunken as an article, such as a heel cover or a bottle cap, should be capable of shrinking greatly so that a single size of mold may be used on several different sizes of heels or bottles. It is also desirable in such instances that the shrunken film should have a certain thickness, for example, .01 of an inch or less. If not so great a shrinkage or not so thin a film is desired, the solid content of the sol may be increased. On the other hand, if a very thin shrunken article such as a membrane for ultrafiltration is desired, the solid content may be decreased, it being possible to produce by molding and subsequent shrinking a membrane of less than .001 of an inch in thickness.

Figure 2:
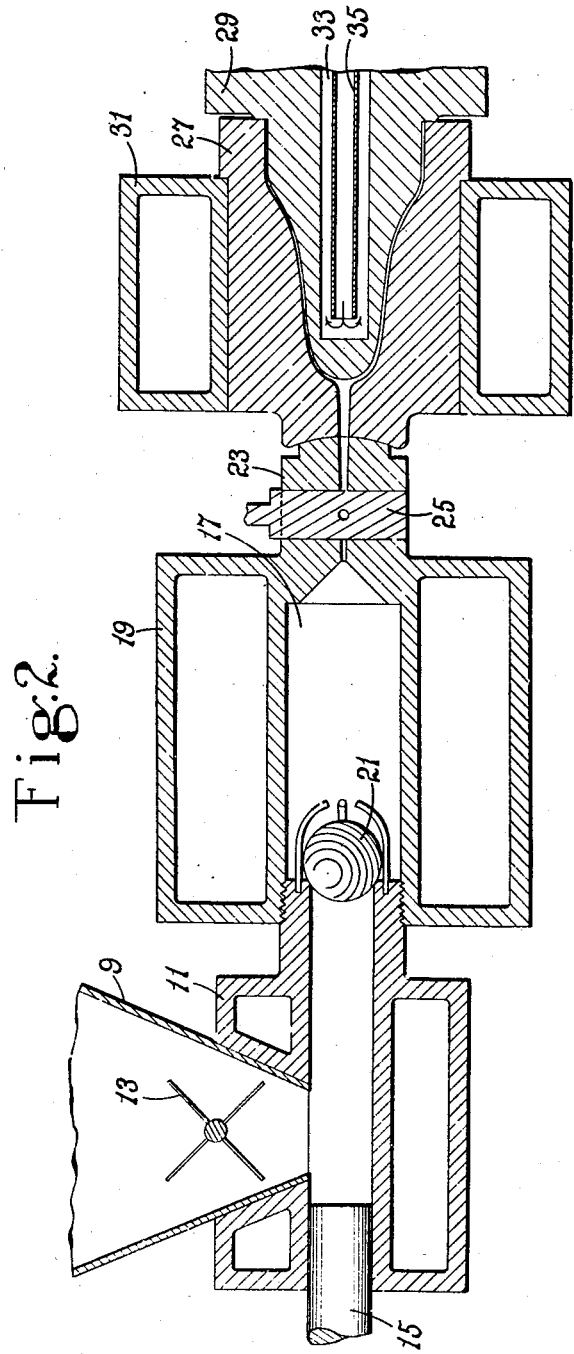
Fig. 2 is a longitudinal medial section of certain parts of an injection molding machine.

Having prepared a suitable sol by any of the procedures given above, it is preferably permitted to cool and thus become converted into an elastic lyogel which may conveniently be used in an injection molding machine, the essential parts of such a machine being shown in Fig. 2. The lyogel, which remains as a large mass in the stirring and heating apparatus referred to above after the sol has cooled, is broken up or cut up and placed, preferably together with whatever liquid is present, in a hopper 9, mounted in a casting 11, which is cored to provide for the circulation through it of a cooling liquid such as water, a stirrer 13 being provided to ensure that the lyogel is fed down in front of a loading plunger 15. This plunger, which is hydraulically reciprocated, forces a certain charge of lyogel at each forward stroke into a heating chamber 17, having a cored jacket 19 for the circulation of a heating liquid such as oil, which is maintained at a temperature sufficient to reconvert the lyogel into a sol. At the inlet to the heating chamber is a ball valve 21.

After the heating chamber has been filled, the material contained therein is under sufficient pressure to keep the ball valve closed, except when the plunger 15 is pushing a charge into it. The sol passes in a stream through a nozzle 23, controlled by a valve 25, into a mold consisting of a cavity member 27, and a die member 29, said mold having a cored jacket 31 through which a cooling liquid such as water is circulated to maintain the mold at room temperature or below that temperature. The die member may also be cooled by circulating a cooling liquid through a chamber 33 by means of a pipe 35 which extends into the chamber. After each injection, the mold is separated from the nozzle and the die member 29 of the mold is withdrawn from the cavity member. A fluid of some sort may be forced through passages (not shown) in the die member against the inside of the molded blank just before the die is withdrawn so that the blank will always remain in the cavity member from which it may readily be removed. Alternatively, the molded article can be caused to remain either in the cavity member or upon the die member, as may be desired, by maintaining one of these members at a higher temperature than the other in which case, when the die member and the cavity member are separated, the article will remain upon the member having the higher temperature since the syneresis will be less on that surface of the article which is adjacent to the member of higher temperature. To this end the cooling chambers in the die member and in the cavity member may be supplied with cooling liquids, the temperatures of which are different.

Figure 3:
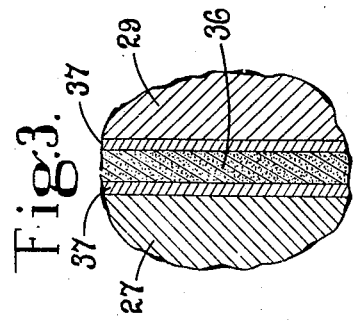
Fig. 3 is a section on a greatly enlarged scale of portions of the die and cavity members of the mold and a portion of the molded gelled article.

In Fig. 3, there are shown on a greatly exaggerated scale, portions of the cavity member 27 and the die member 29, the walls of which may be spaced apart about, for example, .02 of an inch. This space is filled momentarily by the sol of low viscosity, but the formation of the gel 36 is accompanied by sufficient syneresis to provide on each face of the gel a film 37 of liquid sufficient to prevent the gelled article or blank from sticking to the walls of the mold and to insure its ready removal from the mold.

Figure 4:
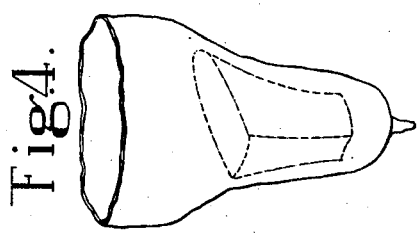
Fig. 4 is a perspective of a heel cover in the form of a lyogel with a heel contained in it.

The cover blank illustrated has the shape shown in Fig. 4. The blank will shrink greatly, and the capability of shrinking is preferably so determined in the manufacture of the material of which the cover blank is made that a single size of blank may be used with a large number of sizes of heels.

The compounds herein described as being suitable for use in injection molding are capable, as has been stated, of other uses which do not involve injection molding, such, for example, as the manufacture of films and filaments. The syneresis not only renders the lyogel substantially non-adherent to the surface of a cool solid by contact with which it may be formed, but also, irrespective of how the cooling is effected, greatly facilitates the subsequent removal of the liquid from the lyogel, since the expulsive force of the shrinking of the lyogel is one of considerable magnitude and can be controlled by controlling the degree of syneresis. Moreover, the lyogel is capable of being stretched considerably before breaking, and such stretching can be practiced, if desired or necessary, in the manufacture of articles from it.

A shrinkable cover blank of the shape shown irrespective of the material of which it consists and of the method by which it is made, the method of applying a shrinkable cover blank to an article, and the covered article are claimed in United States Letters Patent No. 2,236,552, granted April 1, 1941, upon an application filed in my name.

Having thus described the invention, what I claim as new and desire to secure by Letters Patent of the United States is:

1. The method of making a shrinkable article, said method comprising providing a sol composed essentially of an organic plastic material dissolved in a liquid which is a solvent for the plastic material only at an elevated temperature, said sol upon being cooled being capable of becoming substantially instantly a gel with substantially all the liquid retained by said plastic material and accompanied by syneresis, causing the sol at an elevated temperature to contact with a cool member to cause gelling and syneresis to take place whereby the liquid resulting from the syneresis provides lubrication between the gelled article and said cool member, and, before substantial shrinkage of the gelled article has taken place and while the liquid resulting from the syneresis provides lubrication, removing the article from the cool member.

2. The method of making a shrinkable article, said method comprising providing a sol composed essentially of an organic plastic material in the form of a linear macromolecular complex polymer dissolved in a liquid which is a solvent for the polymer only at an elevated temperature, said sol upon being cooled being capable of becoming substantially instantly a gel with substantially all the liquid retained by said polymer and accompanied by syneresis, causing the sol at an elevated temperature to contact with a cool member to cause gelling and syneresis to take place whereby the liquid resulting from the syneresis provides lubrication between the gelled article and said cool member, and, before substantial shrinkage of the gelled article has taken place and while the liquid resulting from the syneresis provides lubrication, removing the article from the cool member.

3. The method of making an injection-molded, shrinkable article, said method comprising providing a sol composed essentially of an organic plastic material dissolved in a liquid which is a solvent for the plastic material only at an elevated temperature, said sol upon being cooled being capable of becoming substantially instantly a gel with the greater part of the liquid retained by said plastic material and accompanied by syneresis, injecting the sol while at an elevated temperature into a cool mold to cause gelling and syneresis to take place whereby the liquid resulting from the syneresis provides lubrication between the walls of the article and the walls of the mold activity, and, before substantial shrinkage of the gelled article has taken place and while the liquid resulting from the syneresis provides lubrication, removing the article from the mold.

4. The method of making a shrinkable article, said method comprising providing a sol composed essentially of an organic plastic material in the form of a linear macromolecular complex polymer dissolved in a liquid which is a solvent for the polymer only at an elevated temperature, said sol upon being cooled being capable of becoming substantially instantly a gel with substantially all the liquid retained by said polymer and accompanied by syneresis, causing the sol at an elevated temperature to flow into a cool mold to cause gelling and syneresis to take place whereby the liquid resulting from the syneresis provides lubrication between the walls of the article and the walls of the mold cavity and before substantial shrinkage of the gelled article has taken place, and, while the liquid resulting from the syneresis provides lubrication, removing the article from the mold.

5. The method of making a thin-walled, hollow, shrinkable article, said method comprising providing a sol composed essentially of an organic plastic material in the form of a linear macromolecular complex polymer dissolved in a liquid which is a solvent for the polymer only at an elevated temperature, said sol upon being cooled being capable of becoming substantially instantly a gel with substantially all the liquid retained by said polymer and accompanied by an amount of syneresis sufficent to prevent the formed article from adhering to the walls of a cool mold, injecting the sol while at an elevated temperature into a cool mold having a narrow cavity to cause gelling and syneresis to take place, whereby the liquid resulting from the syneresis provides lubrication between the walls of the article and the walls of the mold cavity, and, before substantial shrinkage of the gelled article takes place and while the liquid resulting from the syneresis provides lubrication, removing the article.

6. The method of making a shrinkable article, said method comprising providing a sol composed essentially of an organic plastic material in the form of a linear macromolecular complex polymer of cellulosic compounds dissolved in a liquid which is a solvent for the polymer only at an elevated temperature, said sol upon being cooled being capable of becoming substantially instantly a gel with substantially all the liquid retained by said polymer and accompanied by syneresis, injecting the sol at an elevated temperature into a cool mold to cause gelling and syneresis to take place whereby the liquid resulting from the syneresis provides lubrication between the walls of the article and the walls of the mold cavity and, before substantial shrinkage of the gelled article has taken place and while the liquid resulting from the syneresis provides lubrication, removing the article from the mold.

7. The method of making a shrinkable article, said method comprising providing a sol composed essentially of an organic plastic material in the form of a mixed ester of cellulose dissolved in a liquid which is a solvent for the mixed ester only at an elevated temperature, said sol upon being cooled being capable of becoming substantially instantly a gel with substantially all the liquid retained by said ester and accompanied by syneresis, forcing the sol at an elevated temperature into a cool mold to cause gelling and syneresis to take place whereby the liquid resulting from the syneresis provides lubrication between the walls of the article and the walls of the mold cavity and, before substantial shrinkage of the gelled article has taken place and while the liquid resulting from the syneresis provides lubrication, removing the article from the mold.

8. The method of making a shrinkable article, said method comprising providing a sol composed essentially of an organic plastic material in the form of a linear macromolecular complex polymer of vinyl compounds dissolved in a liquid which is a solvent for the polymer only at an elevated temperature, said sol upon being cooled being capable of becoming substantially instantly a gel with substantially all the liquid retained by said polymer and accompanied by syneresis, injecting the sol at an elevated temperature into a cool mold to cause gelling and syneresis to take place whereby the liquid resulting from the syneresis provides lubrication between the walls of the article and the walls of the mold cavity and, before substantial shrinkage of the gelled article has taken place and while the liquid resulting from the syneresis provides lubrication, removing the article from the mold.

ALEXIS E. USHAKOFF.

CERTIFICATE OF CORRECTION.

Patent No. 2,338,787.　　　　　　　　　　　　　January 11, 1944.

ALEXIS E. USHAKOFF.

It is hereby certified that error appears in the printed specification of the above numbered patent requiring correction as follows: Page 2, second column, lines 10 and 11, for "triagle" read --triangle--; page 5, first column, line 69, claim 3, for "actívity" read --cavity--; and that the said Letters Patent should be read with this correction therein that the same may conform to the record of the case in the Patent Office.

Signed and sealed this 11th day of April, A. D. 1944.

Leslie Frazer

(Seal)　　　　　　　　　　　　　　Acting Commissioner of Patents.